US008838765B2

(12) United States Patent
Zhong

(10) Patent No.: US 8,838,765 B2
(45) Date of Patent: Sep. 16, 2014

(54) MODIFYING COMPUTER MANAGEMENT REQUEST

(75) Inventor: Qun Zhong, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 31 days.

(21) Appl. No.: 13/258,496

(22) PCT Filed: Dec. 14, 2009

(86) PCT No.: PCT/US2009/067946
§ 371 (c)(1),
(2), (4) Date: Sep. 22, 2011

(87) PCT Pub. No.: WO2011/075117
PCT Pub. Date: Jun. 23, 2011

(65) Prior Publication Data
US 2012/0246286 A1     Sep. 27, 2012

(51) Int. Cl.
*G06F 15/173* (2006.01)
*G06F 9/44* (2006.01)
(52) U.S. Cl.
CPC .................................. *G06F 9/4445* (2013.01)
USPC .......................................................... 709/223
(58) Field of Classification Search
CPC ......... H04L 41/046; H04L 41/08; G06F 9/46; G06F 2009/45558
USPC ....................................................... 709/223
See application file for complete search history.

(56) References Cited

U.S. PATENT DOCUMENTS

| 5,664,105 | A | 9/1997 | Keisling et al. |
| 6,070,253 | A | 5/2000 | Tavallaei et al. |
| 6,681,282 | B1 | 1/2004 | Golden et al. |
| 6,711,693 | B1 | 3/2004 | Golden et al. |
| 7,149,796 | B2 | 12/2006 | Sanders et al. |
| 7,275,087 | B2 | 9/2007 | Vaschillo et al. |
| 8,341,624 | B1 * | 12/2012 | Hobbs ............................. 718/1 |
| 8,346,897 | B2 * | 1/2013 | Jaroker ........................ 709/220 |
| 2002/0103921 | A1 | 8/2002 | Nair et al. |
| 2002/0143764 | A1 | 10/2002 | Martin et al. |
| 2007/0174851 | A1 | 7/2007 | Smart |
| 2008/0077927 | A1 | 3/2008 | Armstrong et al. |
| 2009/0210527 | A1 | 8/2009 | Kawato |

OTHER PUBLICATIONS

Using Debug Commands on Cisco IOS XR Software, Cisco Systems, Jan. 20, 2008; Retrieved at Aug. 12, 2010 from http://~~~.cisco.com/en/US/docs/ios-xr_sw/iosxr_r3.2/general/debug/user/guide/udb32ch.pdf; See p. 6, Redirecting debug and error message output.

* cited by examiner

*Primary Examiner* — Vivek Srivastava
*Assistant Examiner* — Karina J Garcia-Ching

(57) ABSTRACT

A computer-implemented process provides for intercepting a request from a management tool running on a management system. The request can be for a management tool to run on a managed system. Plural virtual consoles are created for the managed system. The original request is modified to generate a modified request that specifies that plural data types generated by said management tool are to be directed to different respective ones of said virtual consoles.

12 Claims, 2 Drawing Sheets

MODIFYING COMPUTER MANAGEMENT REQUEST

BACKGROUND

In a centrally managed computer system, a management tool may require running a management tool on a remote managed computer. To this end, a virtual console can be created for the remote system, and a request can be sent to the remote system via the remote console. The results, which can include standard normal outputs and error outputs, can then be returned to the management tool via the virtual console.

DETAILED DESCRIPTION

Figure 1:
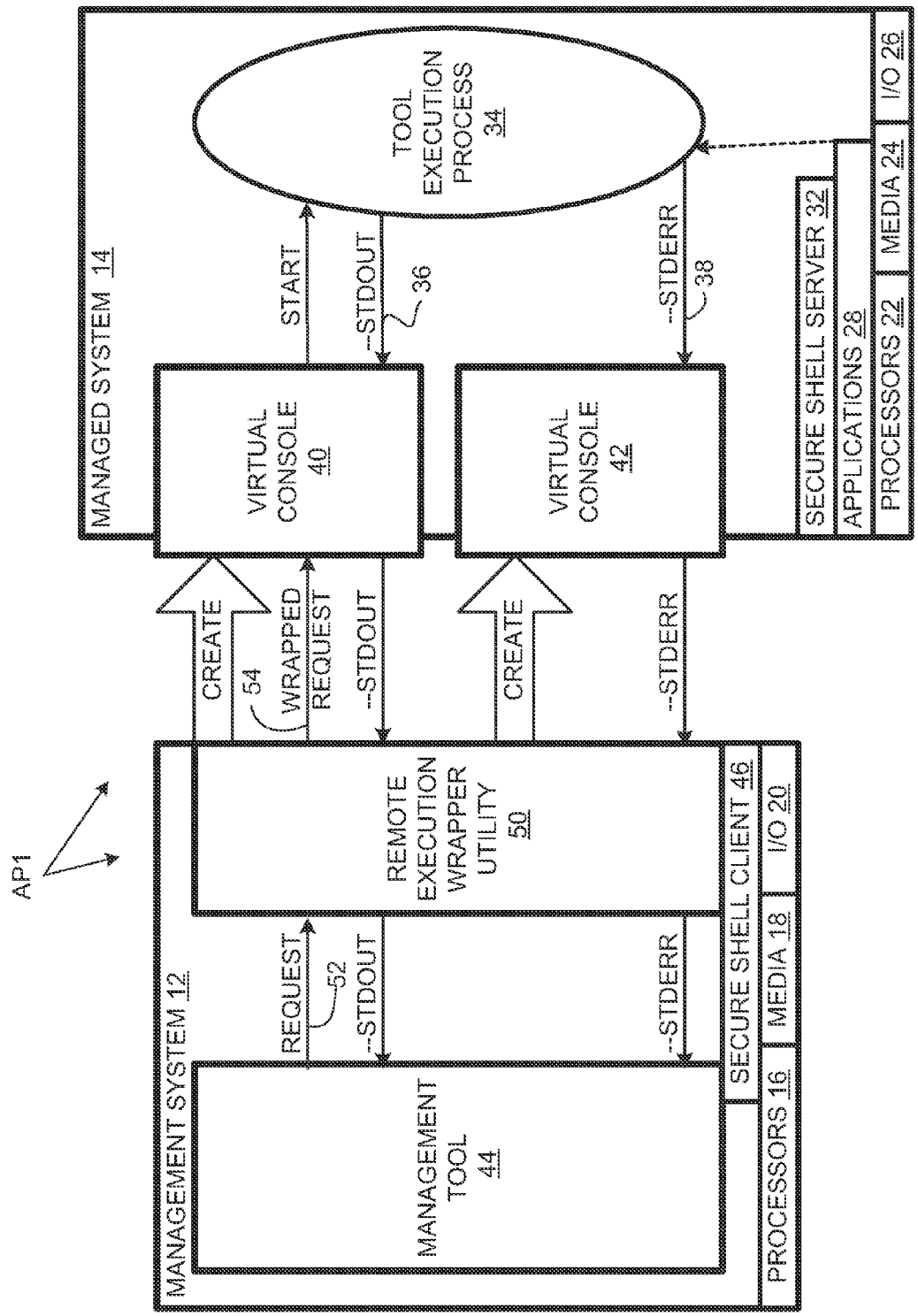
FIG. 1 is a schematic diagram of a computer system in accordance with an embodiment.

In a computer system AP1, FIG. 1, a wrapper utility 50 creates more than one virtual console (or "terminal") so different types of results from a remote system tool can be returned separately to the management tool. For example, standard normal and error outputs can be returned separately to the management tool. This relieves the management tool of having to distinguish normal and error (or other types of) outputs from a unified output from a single virtual console typically used under standard virtual terminal protocols such as secure shell (SSH-1 and SSH-2) and Telnet. This in turn makes it easier for a management tool that depends on a specific output stream's result to determine what steps to follow.

Computer system AP1 includes a management system 12 and a managed system 14. In practice, one management system can manage several or many managed systems. Management system 12 includes processors 16, computer-readable storage media 18, and communications (I/O) devices 20. Managed system includes processors 22, computer-readable storage media 24, and communications (I/O) devices 26. In addition to management and management systems, computer system AP1 includes server and storage array networks and associated devices.

Managed system 14 includes one or more applications 28, e.g., a database, a web application, and/or a monitoring tool that monitors various hardware and software components on the managed system. Managed system 14 also includes a remote console server such as secure shell server 32. In an alternative embodiment, another virtual console protocol such as Telnet is used instead of secure shell (--SSH). These software elements are stored on media 24 and executed by processors 22. When management tool 44 initiates a tool execution process 34, outputs of which can include normal output data (--STDOUT) 36 and error data (--STDERR) 38. Secure shell server 32 can be used to establish virtual terminals 40 and 42 as appropriate.

Management system 12 stores a management tool 44 such as Hewlett-Packard's System Insight Manager (available from Hewlett-Packard Company) and its plug-in applications (available from Hewlett-Packard Company and others) a secure shell client 46, and a remote-execution wrapper utility 50 on media 18 and executes them on processors 16. Communications devices 20 on management system 12 and communications devices 26 on managed system 14 provide for communications between systems 12 and 14.

Management tool 44 is designed to gather various types of data from systems that it manages. When this was done according to prior-art methods, standard output and error outputs were returned together, which posed a problem for the management tool, since it then had to perform the non-trivial task of separating the two.

In system AP1, remote management wrapper utility 50 intercepts a request 52 from management tool 44. Request 52 can be to execute an application 28 so as to generate diagnostic data and return any normal output data and any error data. Utility 50, using secure shell client 46 to communicate with secure shell server 32, causes two virtual consoles 40 and 42 to be created. Utility 50 wraps request 52 to generate wrapped request 54. Wrapped request 54 directs the recipient to return error data to virtual console 42 instead of default virtual console 40 to which the normal data is to be returned. In an alternative embodiment, it is the standard normal output that is redirected to the virtual console not used for receiving the modified request.

Wrapper utility 50 receives the error data 38 via virtual console 42 and separately from normal data 36, which is received via virtual console 40. Thus, wrapper utility 50 can provide normal data 36 and error data 38 separately to management tool 44, which is thus relieved of the burden of separating normal and error data from a unified stream.

Figure 2:
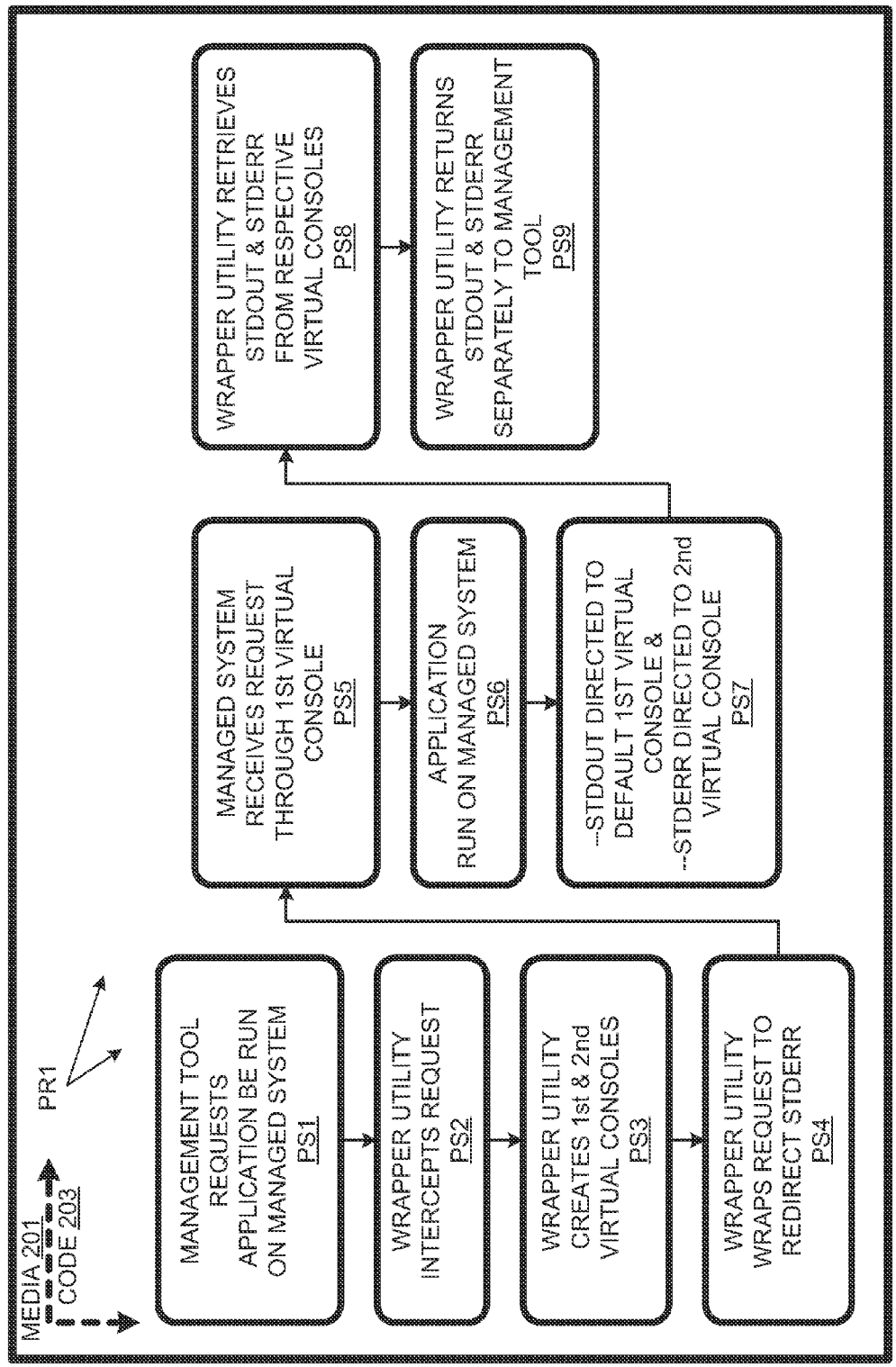
FIG. 2 is a flow chart of a computer-management method in accordance with an embodiment.

A process PR1 practiced in the context of system AP1 is flow charted in FIG. 2. Process PR1 is implemented via computer-readable storage media 201 encoded with code 203. Media 201 includes media 18 and 24 (FIG. 1). Code 203 provides for management tool 44, wrapper utility 50, applications 28, and secure shell client and server 46 and 32.

At process segment PS1, a management tool running on a central management server issues a request that an application be run on a managed system. At process segment PS2, a wrapper utility intercepts the request. At process segment PS3, the wrapper utility creates virtual consoles. In the case of system AP1, two virtual consoles are created. However, in other instances, more than two virtual consoles can be created to provide for keeping separate more than two data types.

At process segment PS4, the wrapper utility wraps and modifies the request to redirect at least one data type. For example, in system AP1, error data is redirected from a default virtual console 40 to virtual console 42. In other embodiments, there is no default virtual console; in such an embodiment, the wrapper utility can direct each data type to a different virtual console.

At process segment PS5, the wrapper utility forwards the wrapped request to one of the virtual consoles of managed system 14. In response to the received request, an application 28 is executed as part of tool execution process 34 at process segment PS6. As a result, normal and error data are generated. In accordance with the request, each data type is provided to the indicated virtual console at process segment PS7. In the case of system AP1, the normal data is directed to virtual console 40, while error data 38 is directed to virtual console 42.

The wrapper utility retrieves the different data types from respective consoles at process segment PS8. In system AP1, wrapper utility 50 retrieves normal data 36 from virtual console 40 and error data 38 from virtual console 42. At process segment PS9, the wrapper utility provides the different data types separately to the requesting management tool. In system AP1, wrapper utility 50 provides normal data 36 and error data 38 separately to management tool 44.

In this specification, related art is discussed for expository purposes. Related art labeled "prior art", if any, is admitted prior art. Related art not labeled "prior art" is not admitted prior art. The illustrated and other described embodiments, as well as modifications thereto and variations thereupon are within the scope of the following claims.

What is claimed is:

1. A computer-implemented process comprising:
intercepting, using a utility running on a management system, an original request from a management tool running on said management system to a tool execution process executing on a managed system to run an application on said managed system;
creating, by said utility, plural virtual consoles for said managed system, said plural virtual consoles including a first virtual console and a second virtual console;
modifying said original request to generate a modified request that,
requires data of a first type generated by said tool execution process to be returned by said tool execution process to said first virtual console, and
specifies that data of a second type generated by said tool execution process is to be directed to said second virtual console; and
forwarding, by said utility, said modified request to said first virtual console;
in response to said modified request, executing said application as part of said tool execution process so as to generate data of said first type and data of said second type;
providing, by said tool execution process,
said data of said first type to said first virtual console, and said data of said second type to said second virtual console;
retrieving, by said utility, said data of said first type from said first virtual console and data of said second type from said second virtual console; and
providing, by said utility, said data of said first type and said data of said second type to said management tool, said data of said second type being provided to said management tool separately from said data of said first type.

2. A process as recited in claim 1 wherein said first data type includes normal output data and does not include error data and said second data type includes error data but does not include normal data.

3. A process as recited in claim 1 wherein said virtual consoles are created using either a secure shell or a Telnet protocol.

4. A process as recited in claim 1 wherein said modifying involves wrapping said request.

5. A computer system comprising:
a management system including a first processor;
a managed system including a second processor; and
non-transitory media encoded with code that, when executed by said first and second processors, implements a method including,
intercepting, using a utility running on a management system, an original request from a management tool running on said management system to a tool execution process executing on a managed system to run an application on said managed system;
creating, by said utility, plural virtual consoles for said managed system, said plural virtual consoles including a first virtual console and a second virtual console;
modifying said original request to generate a modified request that,
requires data of a first type generated by said tool execution process to be returned by said tool execution process to said first virtual console, and
specifies that data of a second type generated by said tool execution process is to be directed to said second virtual console; and
forwarding, by said utility, said modified request to said first virtual console;
in response to said modified request, executing said application as part of said tool execution process so as to generate data of said first type and said data of said second type;
providing, by said tool execution process, said data of said first type to said first virtual console, and data of said second type to said second virtual console;
retrieving, by said utility, said data of said first type from said first virtual console and said data of said second type from said second virtual console; and
providing, by said utility, said data of said first type and said data of said second type to said management tool, said data of said second type being provided to said management tool separately from said data of said first type.

6. A computer system as recited in claim 5 wherein said utility creates said virtual consoles using a secure shell or Telnet protocol.

7. A computer system as recited in claim 5 wherein said modifying involves wrapping said request.

8. A computer system as recited in claim 5 wherein normal output data and error data constitute different ones of said data types.

9. A computer system as recited in claim 5 wherein said non-transitory media is encoded with said application.

10. A computer product comprising non-transitory media encoded with code that, when executed by processors on a management system and a managed system, implements a method including:
intercepting, using a utility running on a management system, an original request from a management tool running on said management system to a tool execution process executing on a managed system to run an application on said managed system;
creating, by said utility, plural virtual consoles for said managed system, said plural virtual consoles including a first virtual console and a second virtual console;
modifying said original request to generate a modified request that,
requires data of a first type generated by said tool execution process to be returned by said tool execution process to said first virtual console, and
specifies that data of a second type generated by said tool execution process is to be directed to said second virtual console; and
forwarding, by said utility, said modified request to said first virtual console;
in response to said modified request, executing said application as part of said tool execution process so as to generate data of said first type and data of said second type;
providing, by said tool execution process, said data of said first type to said first virtual console, and said data of said second type to said second virtual console;
retrieving, by said utility, said data of said first type from said first virtual console and data of said second type from said second virtual console; and
providing, by said utility, said data of said first type and said data of said second type to said management tool, said data of said second type being provided to said management tool separately from said data of said first type.

11. A computer product as recited in claim 10 wherein said utility causes said virtual consoles to be generated using either a secure shell or a Telnet protocol.

12. A computer product as recited in claim 10 wherein;
said first data type includes normal output data and does not include error data; and
said second data type includes error data and does not include normal data.

* * * * *